United States Patent
Shan et al.

(10) Patent No.: US 8,565,208 B2
(45) Date of Patent: Oct. 22, 2013

(54) APPARATUS AND METHOD FOR TRANSMITTING COEXISTENCE BEACON PROTOCOL IN A COGNITIVE RADIO SYSTEM

(75) Inventors: Cheng Shan, Suwon-si (KR); Do-Young Kim, Yongin-si (KR); Eun-Taek Lim, Suwon-si (KR); Jung-Soo Woo, Suwon-si (KR); Geun-Ho Lee, Suwon-si (KR); Sang-Bum Kim, Seoul (KR); Yong-Ho Park, Cheonan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1275 days.

(21) Appl. No.: 12/393,305

(22) Filed: Feb. 26, 2009

(65) Prior Publication Data

US 2009/0213007 A1 Aug. 27, 2009

(30) Foreign Application Priority Data

Feb. 27, 2008 (KR) .......................... 10-2008-0017672

(51) Int. Cl.
*H04J 3/06* (2006.01)
(52) U.S. Cl.
USPC ...... 370/341; 370/350; 370/395.62; 342/385; 342/422
(58) Field of Classification Search
USPC .................... 370/328, 329, 341, 350, 395.62; 455/435.1; 342/380
See application file for complete search history.

(56) References Cited

U.S. PATENT DOCUMENTS

| | | | | |
|---|---|---|---|---|
| 5,175,867 A * | 12/1992 | Wejke et al. | ................ | 455/439 |
| 6,526,035 B1 * | 2/2003 | Atarius et al. | ................ | 370/342 |
| 7,826,422 B2 * | 11/2010 | Chu et al. | ................ | 370/329 |
| 7,953,372 B2 * | 5/2011 | Ofek et al. | ................ | 455/63.4 |
| 7,965,979 B2 * | 6/2011 | Waxman | ................ | 455/11.1 |
| 2002/0032031 A1 * | 3/2002 | Ogino et al. | ................ | 455/435 |
| 2004/0063430 A1 * | 4/2004 | Cave et al. | ................ | 455/436 |
| 2004/0196813 A1 * | 10/2004 | Ofek et al. | ................ | 370/334 |
| 2004/0196834 A1 * | 10/2004 | Ofek et al. | ................ | 370/352 |
| 2006/0040656 A1 * | 2/2006 | Kotzin | ................ | 455/426.2 |
| 2007/0010251 A1 * | 1/2007 | Cho et al. | ................ | 455/436 |
| 2007/0053318 A1 * | 3/2007 | Proctor et al. | ................ | 370/329 |
| 2008/0159258 A1 * | 7/2008 | Ji et al. | ................ | 370/350 |
| 2008/0207204 A1 * | 8/2008 | Vlantis et al. | ................ | 455/435.2 |
| 2009/0296598 A1 * | 12/2009 | Harvey et al. | ................ | 370/252 |
| 2011/0222448 A1 * | 9/2011 | Ofek et al. | ................ | 370/310 |

* cited by examiner

*Primary Examiner* — Hassan Kizou
*Assistant Examiner* — Emmanuel Maglo
(74) *Attorney, Agent, or Firm* — Jefferson IP Law, LLP (57) ABSTRACT

An apparatus and method for transmitting Coexistence Beacon Protocol (CBP) in a cognitive radio system are provided. The apparatus includes a detector, a controller, and a transmitter. The detector scans channels on which neighboring Base Stations (BSs) operate through a plurality of directional antennas. The controller links the plurality of directional antennas with BSs, respectively. The transmitter receives a CBP packet through the directional antenna linked with the BS, and transmits the received CBP packet to at least one or more other BSs linked with at least one or more other directional antennas.

16 Claims, 5 Drawing Sheets

APPARATUS AND METHOD FOR TRANSMITTING COEXISTENCE BEACON PROTOCOL IN A COGNITIVE RADIO SYSTEM

PRIORITY

This application claims the benefit under 35 U.S.C. §119(a) of a Korean patent application filed in the Korean Intellectual Property Office on Feb. 27, 2008 and assigned Serial No. 10-2008-0017672, the entire disclosure of which is hereby incorporated by reference.

BACKGROUND OF THE INVENTION

1. Field of the Invention

The present invention relates to a cognitive radio system. More particularly, the present invention relates to an apparatus and method for transmitting reliable Coexistence Beacon Protocol (CBP) in the cognitive radio system.

2. Description of the Related Art

In recent years, with the expansion of the wireless communication system market, the shortage of frequency resources has become a concern. To address this concern, research on Cognitive Radio (CR) technology is actively in progress. In order to prevent interference in a licensed band of an Incumbent User (IU) while enabling a new CR user to communicate, the CR technology is designed to perform a transmission channel setup process of periodically or randomly measuring an IU and unexpected interference of a corresponding channel and repeating a positive communication channel setup/switching/transmission/release. For this, the CR essentially requires an IU protection function, a self coexistence function, etc. In other words, in a CR system, it is required to share an available channel set between cells and thus, it is required to share IU information between adjacent cells to avoid mutual interference. The mutual exchange of channel usage information is essential to effective system maintenance.

At present, in order to address the issue of mutual coexistence based on a radio link, the Institute of Electrical and Electronics Engineering (IEEE) 802.22 standard working group has designed for the exchange of information between a Base Station (BS) and a Customer Premises Equipment (CPE), which is terminal equipment, using a kind of Media Access Control (MAC) control message that is called Coexistence Beacon Protocol (CBP).

The BS exchanges necessary information with all CPEs belonging to a corresponding BS or a neighboring BS, using the CBP. For example, if a specific CPE being at a cell boundary receives CBP from a BS of an adjacent cell, the CPE reports the received CBP information to its serving BS. Upon receiving the CBP, the serving BS performs a resource optimization process of channel switching, transmit power control, resource renting or clustering, etc. based on the CBP information, thereby reducing interference and achieving efficient bandwidth usage.

In detail, in the conventional art, the CBP is transmitted by a BS or CPE within a cell during a Self Co-existence Window (SCW) duration (i.e., a preset time slot duration). During the SCW duration, a CPE in an active mode transmits the CBP and a CPE in a passive mode receives the CBP.

However, when a CPE that is at a cell boundary transmits received CBP to a BS, the BS may not operate in a passive mode. That is, when the CPE transmits the CBP to the BS, the BS may be transmitting CBP to the CPE. If the BS to which the CPE is to transmit the CBP is in an active mode rather than a passive mode, the BS fails to receive the CBP or a CBP collision occurs.

As described above, the conventional art has a problem that a CPE being at a cell boundary fails to support reliable CBP transmission in a cognitive radio communication system. Accordingly, there is a need for apparatus and method for transmitting a reliable Coexistence Beacon Protocol (CBP) packet in a cognitive radio system.

SUMMARY OF THE INVENTION

An aspect of the present invention is to address at least the above-mentioned problems and/or disadvantages and to provide at least the advantages described below. Accordingly, an aspect of the present invention is to provide an apparatus and method for transmitting a reliable Coexistence Beacon Protocol (CBP) packet in a cognitive radio system.

The above aspects are achieved by providing an apparatus and method for transmitting CBP in a cognitive radio system.

According to an aspect of the present invention, an apparatus for transmitting Coexistence Beacon Protocol (CBP) in a cognitive radio system is provided. The apparatus includes a detector, a controller, and a transmitter. The detector scans channels on which a plurality of neighboring Base Stations (BSs) operate through a plurality of directional antennas. The controller links the plurality of directional antennas with the plurality of neighboring BSs, respectively. The transmitter receives a CBP packet through one of the plurality of directional antennas linked with one of the respective neighboring BSs, and transmits the received CBP packet to at least one or more of the plurality of neighboring BSs linked with at least one or more other of the plurality of directional antennas.

According to another aspect of the present invention, a BS for transmitting CBP in a cognitive radio system is provided. The BS includes a controller and a scheduler. The controller permits the access of a Mobile Station (MS) according to a preset process, identifies if the MS includes dedicated equipment transmitting a CBP packet, and gathers corresponding information from the dedicated equipment transmitting the CBP packet. The scheduler schedules CBP packet transmission depending on the corresponding information.

According to a still another aspect of the present invention, a method for transmitting CBP in a cognitive radio system is provided. The method includes scanning channels on which a plurality of neighboring BSs operate through a plurality of directional antennas, linking the plurality of directional antennas with the plurality of neighboring BSs, respectively, and receiving at least one CBP packet through one of the plurality of directional antennas respectively linked with the plurality of neighboring BSs, and transmitting the received at least one CBP packet to at least one or more other BSs linked with at least one or more other directional antennas.

According to a yet another aspect of the present invention, an operation method of a BS for transmitting CBP in a cognitive radio system is provided. The method includes permitting access of an MS according to a preset process, identifying if the MS includes dedicated equipment transmitting a CBP packet, if the MS is identified as the dedicated equipment, gathering corresponding information from the dedicated equipment transmitting the CBP packet, and scheduling CBP packet transmission according to the corresponding information.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

An apparatus and method for transmitting reliable Coexistence Beacon Protocol (CBP) in a cognitive radio system according to exemplary embodiments of the present invention are described below.

Figure 1:
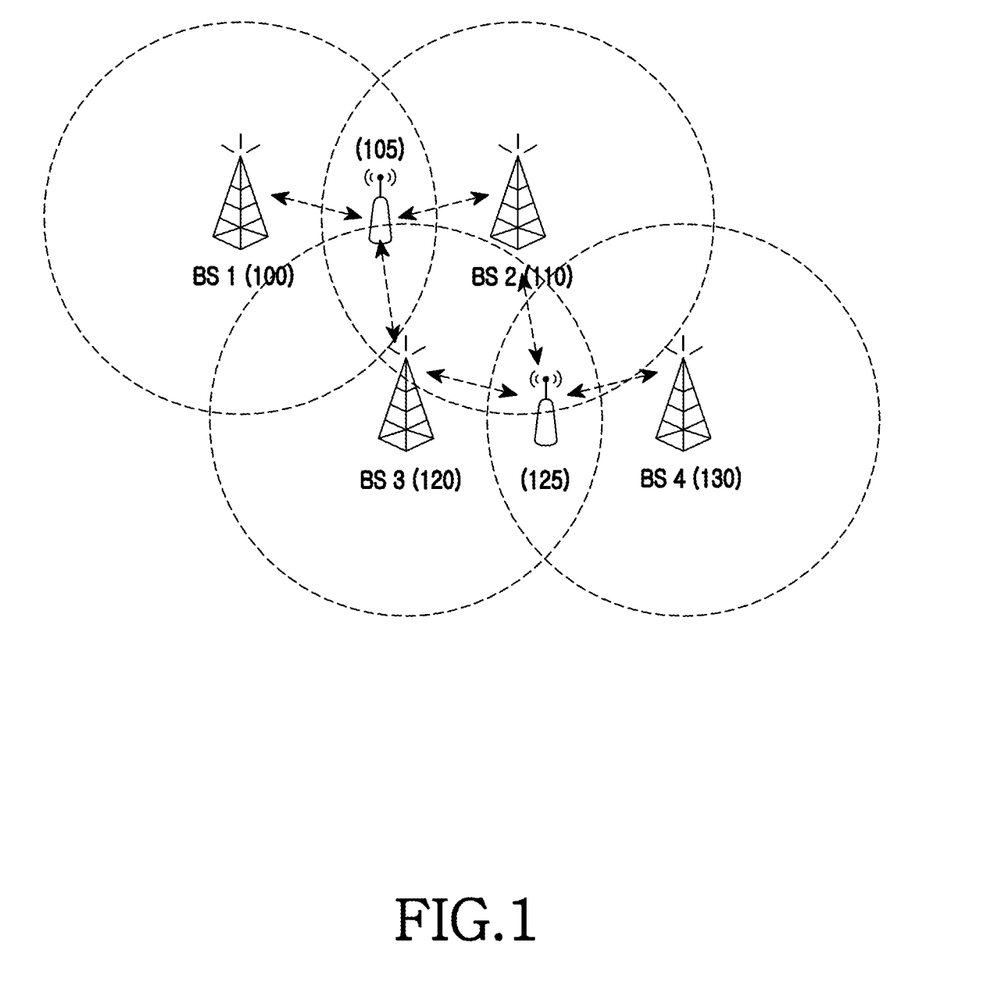
FIG. 1 is a diagram illustrating a Coexistence Beacon Protocol (CBP) transmission scenario in a cognitive radio system according to an exemplary embodiment of the present invention.

FIG. 1 illustrates a CBP transmission scenario in a cognitive radio system according to an exemplary embodiment of the present invention.

Referring to FIG. 1, on the basis of a cognitive radio technology, Base Stations (BSs) 100, 110, 120, and 130 each perform communication with Customer Premises Equipments (CPEs) (not shown) within their own cell areas. To support this communication, the BSs 100, 110, 120, and 130 each have to exchange a channel sensing result with the CPEs that are within their own cells and determine an operation channel to prevent influence (e.g., interference) on an existing system (not shown). Also, because it is required to share a mutually available channel set between cells of BSs (e.g., BS1 100-BS2 110, BS1 100-BS3 120, BS2 110-BS3 120, BS2 110-BS4 130, and BS3 120-BS4 130), it is required to exchange interference avoidance and existing system information between adjacent cells.

For example, a BS uses a CBP packet to forward necessary information to all CPEs within its cell area or a neighboring BS. If a CPE (not shown) receives a CBP packet at a cell boundary of the BS1 100 from the neighboring BS2 110 or BS3 120, the CPE reports the received CBP information to its serving BS 1100. Similarly, the CPE receives a CBP packet from the serving BS 1100, and transmits the received CBP packet to the neighboring BS2 110 or BS3 120.

As described above, in the conventional art, in a passive mode, the CPE receives a CBP packet from the serving BS1 100 or from the neighboring BS2 110 or BS3 120 or, in an active mode, transmits a CBP packet to the serving BS1 100 or to the neighboring BS2 110 or BS3 120.

However, at a time the neighboring BS2 110 or BS3 120 transmits a CBP packet, the CPE may not be in the passive mode and thus, may fail to receive the CBP packet from the neighboring BS2 110 or BS3 120.

To address this issue, an exemplary embodiment of the present invention introduces virtual CPEs 105 and 125 located between cells.

The virtual CPEs 105 and 125 use the same wireless interface and protocol as a general CPE of a conventional cognitive radio system. However, the virtual CPEs 105 and 125 do not generate their own traffic. The virtual CPEs 105 and 125 merely support a relay of a CBP packet between neighboring BSs. For instance, if the virtual CPE 105 is located among the service coverage areas of BS1 100, BS2 110, and BS3 120, the virtual CPE 105 can receive a CBP packet from the BS1 100 and transmit the CBP packet to the BS2 110 and BS3 120. Alternatively, the virtual CPE 105 can receive a CBP packet from the BS2 110 or BS3 120 and forward the CBP packet to the BS1 100. Similarly, if the virtual CPE 125 is located among the service coverage areas of BS2 110, BS3 120, and BS4 130, the virtual CPE 125 can receive a CBP packet from the BS2 110 and transmit the CBP packet to the BS3 120 and BS4 130. Alternatively, the virtual CPE 125 can receive a CBP packet from the BS3 120 or BS4 130 and transmit the CBP packet to the BS2 110.

That is, the virtual CPEs 105 and 125 are installed such that they operate to enhance CBP performance. The virtual CPEs 105 and 125 are located and installed such that distances between the virtual CPEs 105 and 125 and BSs are similar. The virtual CPEs 105 and 125 should be adjusted such that a plurality of directional antennas point to corresponding BSs, respectively. The directional antennas are linked with neighboring BSs, respectively. For example, assuming that the virtual CPE 105 is equipped with three directional antennas, a first directional antenna links with the BS1 100 and supports communication between the virtual CPE 105 and the BS1 100. Similarly, a second directional antenna links with the BS2 110 and supports communication between the virtual CPE 105 and the BS2 110, and a third directional antenna links with the BS3 120 and supports communication between the virtual CPE 105 and the BS3 120. The virtual CPE 125 is also equipped with three directional antennas, and the directional antennas are linked with the BS2 110, BS3 120, and BS4 130 and enable communication. Of course, each of CPEs 105 and 125 may be equipped with more or fewer directional antennas, depending on the number of BSs with which the CPE communicates.

As such, the virtual CPEs 105 and 125 can simultaneously access the neighboring BSs. If the virtual CPEs 105 and 125 have the same distance from the neighboring BSs, the virtual CPEs 105 and 125 can use a common clock to simultaneously access the neighboring BSs. If the virtual CPEs 105 and 125 have different distances from the neighboring BSs, the virtual CPEs 105 and 125 can use a different clock, maintaining synchronization with the neighboring BSs, respectively.

As described above, the virtual CPEs 105 and 125 access two or more neighboring BSs according to a network entry process. Also, the neighboring BSs have to know if an access CPE is a virtual CPE. This is performed by allowing the virtual CPEs 105 and 125 to transmit a message to the BS1 100, BS2 110, BS3 120, and BS4 130 during initialization or after initialization. Alternatively, the BS can manage a database for storing Media Access Control (MAC) addresses of all adjacent virtual CPEs 105 and 125. Therefore, when the virtual CPEs 105 and 125 get access to a BS, the BS can be aware that the access CPE is a virtual CPE using an additional message or a MAC address, and the BS may schedule CBP transmission.

When a BS linked with a directional antenna of a virtual CPE schedules a CBP packet, the virtual CPE may transmit the CBP packet to other BSs through other directional antennas.

The virtual CPE is described below in more detail with reference to FIGS. 2 and 4.

Figure 2:
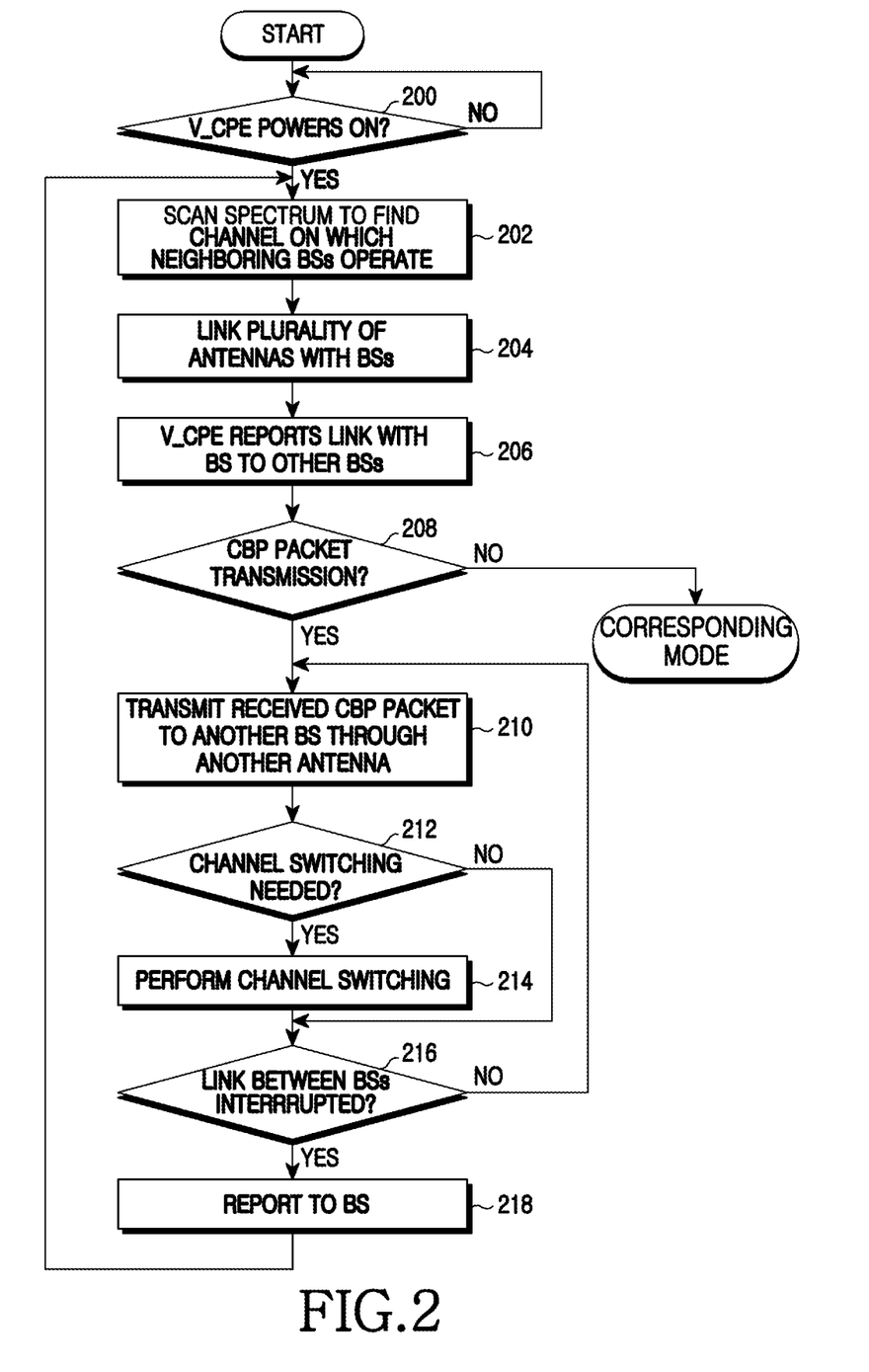
FIG. 2 is a flow diagram illustrating an operation of a virtual Customer Premises Equipment (CPE) for CBP transmission according to an exemplary embodiment of the present invention.

FIG. 2 illustrates an operation of a virtual CPE for CBP transmission according to an exemplary embodiment of the present invention. In the illustrated example, the virtual CPE is equipped with a plurality of directional antennas, and the plurality of directional antennas independently communicate with corresponding BSs, respectively. Also, in the illustrated example, all BSs are in synchronization. Accordingly, the virtual CPE can simultaneously perform transmission/reception through the plurality of directional antennas each linked with the BSs.

Referring to FIG. 2, if the virtual CPE (V_CPE) powers on in step 200, the virtual CPE proceeds to step 202 and searches for channels on which neighboring BSs operate using the respective directional antennas.

In step 204, the virtual CPE forms a link with a BS using the directional antenna depending on a signal strength received by each directional antenna. For example, in FIG. 1, if the virtual CPE 105 has first, second, and third directional antennas each installed to face the BS1 100, BS2 110, and BS3 120, a signal strength of the BS1 100 is the largest at the first directional antenna, a signal strength of the BS2 110 is the largest at the second directional antenna, and a signal strength of the BS3 120 is the largest at the third directional antenna. Thus, the virtual CPE 105 can communicate with the BS1 100 through the first directional antenna, the BS2 110 through the second directional antenna, and the BS3 120 through the third directional antenna.

In an exemplary implementation, in a state in which a BS is linked with one antenna, if a receive power of the virtual CPE is less than a threshold value, the link between the antenna and the BS can be released to guarantee reliable CBP bridging. The CBP bridging represents that the virtual CPE transmits a CBP packet, which is received from a BS through the first directional antenna, to other BSs through the second and third directional antennas.

In step 206, the virtual CPE links the plurality of directional antenna with the BSs, respectively, and sends a report of inter-antenna-BS link information to the BSs.

For example, in FIG. 1, the virtual CPE 105 sends a report that it is linked with the BS2 110 and BS3 120 to the BS1 100. Similarly, the virtual CPE 105 sends a report that it is linked with the BS1 100 and BS3 120 to the BS2 110, and sends a report that it is linked with the BS1 100 and BS2 110 to the BS3 120. The report message may include IDentifiers (IDs) of at least one or more other BSs, thus enabling a BS to link with the at least one or more other BSs.

If the virtual CPE receives a CBP packet from an accessed BS in step 208, the virtual CPE proceeds to step 210 and transmits the received CBP packet to another BS through an appropriate antenna. If the virtual CPE does not receive a CBP packet from the accessed BS, the virtual CPE performs a corresponding mode. In the corresponding mode, the virtual CPE maintains an inter-BS-antenna link and, if necessary, can perform link updating.

For example, in FIG. 1, the virtual CPE can transmit a CBP packet, which is received from the BS1 100 through the first directional antenna, to the BS2 110 through the second directional antenna or transmit the received CBP packet to the BS3 120 through the third directional antenna. Also, the virtual CPE can transmit a CBP packet, which is received from the BS2 110 through the second directional antenna, to the BS1 100 through the first directional antenna or transmit the received CBP packet to the BS3 120 through the third directional antenna.

If it is determined that there is a need for channel switching in step 212, the virtual CPE proceeds to step 214 and performs the channel switching and proceeds to step 216. The channel switching is an operation of changing an in-use channel into another channel to protect an incumbent user. If it is determined that there is no need for channel switching in step 212, the virtual CPE proceeds to step 216.

In step 216, the virtual CPE determines if there is an interruption of a link between BSs. If there is an interruption, in step 218 the virtual CPE reports the interruption to the BSs and returns to step 202. If there is no interruption of the link between the BSs, the virtual CPE returns to step 210. For example, in FIG. 1, if there is an interruption of a link between the first directional antenna and the BS1 100, the virtual CPE reports the interruption to the BS1 100, BS2 110, and BS3 120.

Then, the virtual CPE terminates the CBP transmission process.

Figure 3:
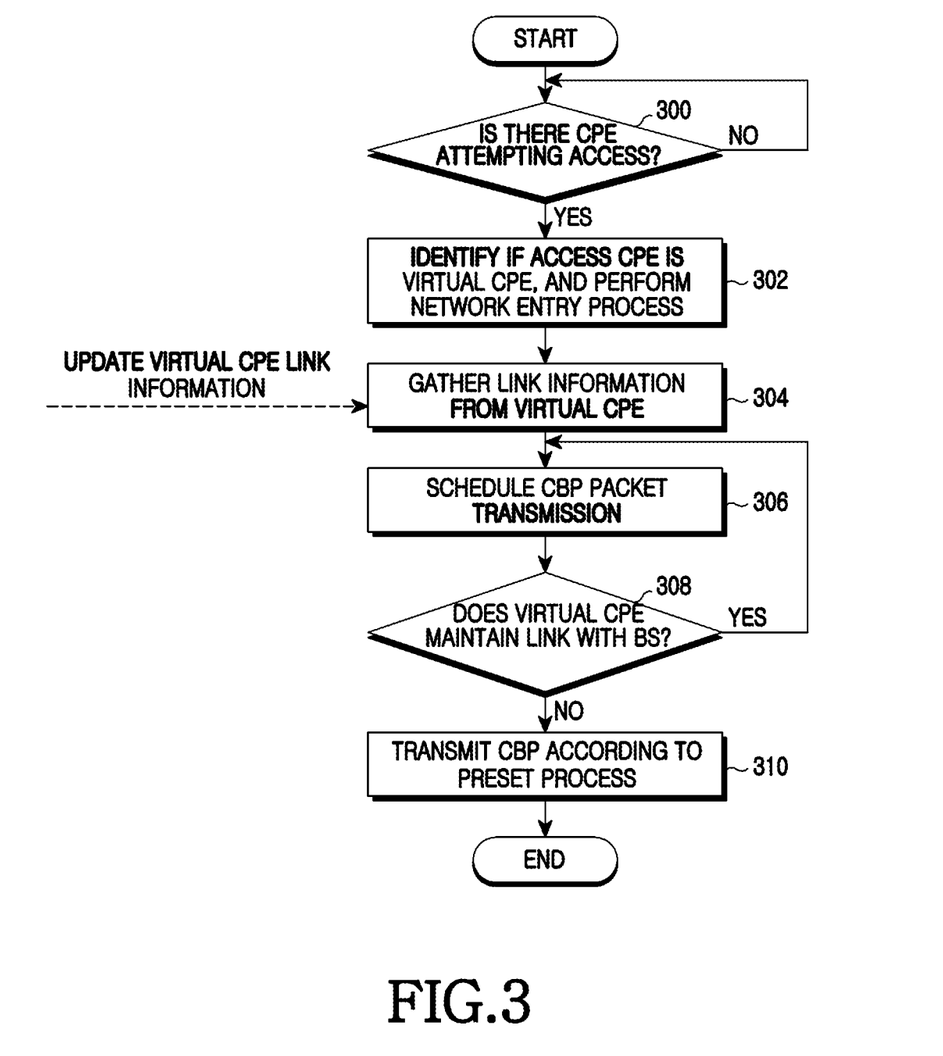
FIG. 3 is a flow diagram illustrating an operation of a Base Station (BS) for reliable CBP transmission according to an exemplary embodiment of the present invention.

FIG. 3 illustrates an operation of a BS for reliable CBP transmission according to an exemplary embodiment of the present invention.

Referring to FIG. 3, if it is determined that there is a CPE attempting access in step 300, the BS performs a network entry process with the CPE in step 302. The BS can identify if the CPE attempting access is a virtual CPE.

An exemplary method for identifying if the CPE attempting access is a virtual CPE is described. First, if the virtual CPE transmits a MAC ID, the BS can perform identification through a comparison with MAC ID information on a virtual CPE within a database. In an exemplary implementation, the BS may add a new field to a ranging request or registration request message, thus including information on a virtual CPE. Also, the BS can allocate a special ranging code because there are fewer virtual CPEs than general CPEs.

In step 304, the BS gathers inter-antenna-BS link information from a linked virtual CPE. For example, in FIG. 1, the BS1 100 receives a report that there is a link to the BS2 110 and BS3 120 from the virtual CPE 105. Similarly, the BS2 110 receives a report that there is a link to the BS1 100 and BS3 120 from the virtual CPE 105, and the BS3 120 receives a report that there is a link to the BS1 100 and BS2 110 from the virtual CPE 105.

In step 306, the BS schedules CBP packet transmission using the link information reported by the virtual CPE.

In view of the fact that the BS can have knowledge of a neighboring BS to which a virtual CPE can bridge a CBP packet, the BS is dependent in its CBP packet transmission on the virtual CPE. Accordingly, the BS does not need to assign CBP transmission to CPEs that are near the virtual CPE, thus achieving resource savings and a reduction of the probability of CBP collision.

In step 308, the BS determines if the virtual CPE maintains its link with a corresponding BS. If the inter-BS-antenna link is not maintained, in step 310, the BS performs CBP transmission according to a preset process.

In other words, the virtual CPE has to update/maintain a link between BSs, and report updated information to the BSs. If the virtual CPE cannot maintain its link with one of the pair of linked BSs, the virtual CPE immediately reports it to the other linked BSs. At this time, the updated BS stops transmitting a CBP packet through the virtual CPE, and transmits a CBP packet in an existing method.

If there is a search and link with a new BS, the virtual CPE immediately informs the linked BSs of the link with the new BS. At this time, the linked BS schedules CBP transmission to the new BS through the virtual CPE.

Then, the BS terminates the CBP transmission process.

Figure 4:
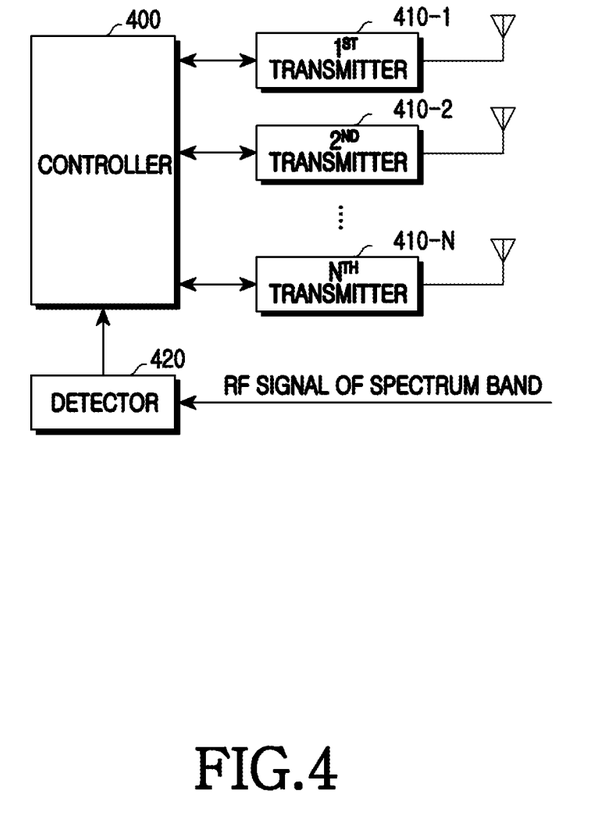
FIG. 4 is a block diagram illustrating a construction of a virtual CPE for reliable CBP transmission in a cognitive radio system according to an exemplary embodiment of the present invention.

FIG. 4 illustrates a construction of a virtual CPE apparatus for reliable CBP transmission according to an exemplary embodiment of the present invention.

Referring to FIG. 4, the virtual CPE includes a controller 400, a first transmitter 410_1 to an $N^{th}$ transmitter 410_N and a detector 420.

The controller 400 links a plurality of directional antennas to BSs, respectively, and transmits information on the links between the directional antennas and the BSs to the BSs, respectively. The controller 400 receives a CBP packet from the linked BS, and transmits the received CBP packet to at least one or more other linked BSs. If there is an interruption of the link between the directional antenna and the BS, the controller 400 reports the interruption to the BS.

The first transmitter 410_1 to $N^{th}$ transmitter 410_N receive synchronization information and CBP information from the controller 400, and independently transmit CBP data through a plurality of directional antennas each linked with BSs. CBP packets transmitted through the plurality of directional antennas can be either synchronized using a common system clock or can be synchronized using an independent system clock.

For example, the controller 400 transmits a CBP packet, which is received through the first transmitter 410_1, to linked BSs through the second transmitter 410_2 to $N^{th}$ transmitter 410_N. For another example, the controller 400 receives a CBP packet through the second transmitter 410_2, and transmits the received CBP packet to other linked BSs through the first transmitter 410_1 and the third transmitter 410_3 to $N^{th}$ transmitter 410_N.

The detector 420 scans channels on which neighboring BSs operate through the plurality of directional antennas, and provides the scanning result to the controller 400.

Figure 5:
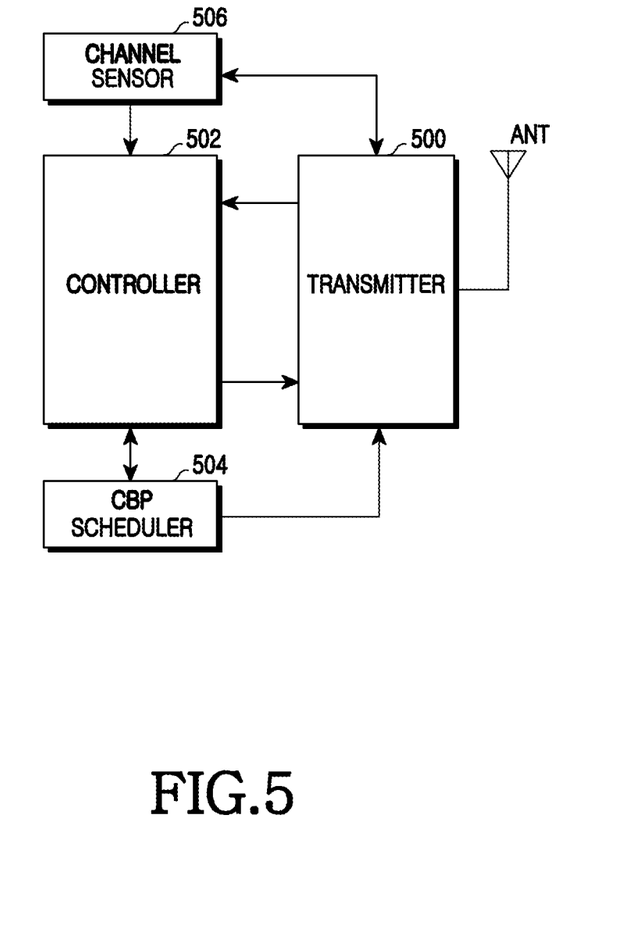
FIG. 5 is a block diagram illustrating a construction of a BS for reliable CBP transmission in a cognitive radio system according to an exemplary embodiment of the present invention.

FIG. 5 is illustrates a construction of a BS for CBP transmission according to an exemplary embodiment of the present invention.

Referring to FIG. 5, the BS includes a transmitter 500, a controller 502, a CBP scheduler 504, and a channel sensor 506.

The transmitter 500 receives data from a CPE or a virtual CPE through an antenna and outputs the data to the controller 502. Alternatively, the transmitter 500 receives data such as CBP from the controller 502 and transmits the data to a linked CPE through a coding and modulation process.

The controller 502 permits the access of a Mobile Station (MS) according to a preset process, and identifies if the MS is a dedicated equipment (e.g., a virtual CPE) transmitting a CBP packet. If the MS is a dedicated equipment transmitting a CBP packet, the controller 502 gathers corresponding information from the dedicated equipment. If being informed that there is a link with a BS from the dedicated equipment, the controller 502 updates link information, and transmits a CBP packet to a non-linked BS according to a preset process. Whether the MS is a dedicated equipment transmitting a CBP packet can be identified by one of a MAC address or a registration request/ranging request message and a dedicated ranging code.

The CBP scheduler 504 receives CBP information and the corresponding information from the controller 502, and schedules CBP transmission depending on the corresponding information. The corresponding information may include information on a link between a dedicated equipment equipped with a plurality of directional antennas and a BS.

The channel sensor 506 determines if a channel or frequency band of an IU is in use from a signal received through the transmitter 500 and provides the determination result to the controller 502.

As described above, an exemplary embodiment of the present invention has an advantage of being able to perform reliable CBP transmission by using a virtual CPE in a cognitive radio system. Also, CBP transmission is dependent on the virtual CPE and thus, there is no need to allocate separate resources for CBP transmission to a CPE that is near the virtual CPE.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for Customer Premises Equipment (CPE) in a wireless communication system, the apparatus comprising:
   a plurality of directional antennas;
   a detector for scanning channels on which a plurality of neighboring Base Stations (BSs) operate, wherein the scanning uses the plurality of directional antennas;
   a controller for linking one of the plurality of directional antennas with each of the plurality of neighboring BSs, respectively;
   a transceiver for receiving a Coexistence Beacon Protocol (CBP) packet through one of the plurality of directional antennas linked with one of the respective neighboring BSs, and for transmitting the received CBP packet to at least one or more other of the plurality of neighboring BSs linked with at least one or more other of the plurality of directional antennas, wherein the transceiver respectively transmits two or more received CBP packets to two or more of the plurality of the neighboring BSs, and wherein the two or more CBP packets transmitted through the two or more of the plurality of directional antennas are synchronized using an independent system clock, if a distance between the apparatus and one of the neighboring BSs is different from a distance between the apparatus and another of the neighboring BSs.

2. The apparatus of claim 1, wherein the controller controls transmission of information on the link between the one of the plurality of directional antennas and the one of the respective neighboring BSs, to other linked BSs.

3. The apparatus of claim 1, wherein, when the link between the one of the plurality of directional antennas and the one of the respective neighboring BSs is interrupted, the controller reports the link interruption.

4. The apparatus of claim 1, wherein the transceiver respectively transmits two or more received CBP packets to two or more of the plurality of the neighboring BSs and further wherein the two or more CBP packets transmitted through the two or more of the plurality of directional antennas are synchronized using a common system clock.

5. The apparatus of claim 1, wherein the transceiver transmits a message to the plurality of neighboring BSs during at least one of initialization and after initialization to identify the apparatus.

6. A Base Station (BS) in a wireless communication system, the BS comprising:
  a controller for permitting access of a Mobile Station (MS) according to a preset process, for determining if the MS includes a dedicated equipment transmitting a Coexistence Beacon Protocol (CBP) packet, and for gathering corresponding information from the dedicated equipment transmitting the CBP packet; and
  a scheduler for scheduling CBP packet transmission depending on the corresponding information,
  wherein, when there is a notification of a link with a neighboring BS from the dedicated equipment, link information is updated and a CBP packet is transmitted to a non-linked BS according to a preset process.

7. The BS of claim 6, wherein the corresponding information comprises information on a link between the dedicated equipment, equipped with a plurality of directional antennas, and a neighboring BS.

8. The BS of claim 6, wherein the determining of whether the MS includes the dedicated equipment transmitting the CBP packet comprises using one of a Media Access Control (MAC) address and a registration request/ranging request message and a dedicated ranging code.

9. A method for operating Customer Premises Equipment (CPE) comprising a plurality of directional antennas in a wireless communication system, the method comprising:
  scanning channels on which a plurality of neighboring Base Stations (BSs) operate, using the plurality of directional antennas;
  linking one of the plurality of directional antennas with each of the plurality of neighboring BSs, respectively; and
  receiving at least one Coexistence Beacon Protocol (CBP) packet through one of the plurality of directional antennas respectively linked with one of the plurality of neighboring BSs, and transmitting the received at least one CBP packet to at least one or more other BSs linked with at least one or more other directional antennas,
  wherein the receiving of the at least one CBP packet comprises receiving a plurality of CBP packets and the transmitting of the received at least one CBP packet comprises transmitting the plurality of received CBP packets through the plurality of directional antennas, and
  wherein the transmitting of the plurality of received CBP packets comprises synchronizing the transmission of the plurality of received CBP packets using an independent system clock, if a distance between the CPE and one of the neighboring BSs is different from a distance between the CPE and another of the neighboring BSs.

10. The method of claim 9, further comprising transmitting information on at least one of the plurality of links between the plurality of directional antennas and the corresponding plurality of BSs, to at least one of the other linked BSs.

11. The method of claim 9, further comprising, when one or more of the respective links between the plurality of directional antennas and the plurality of neighboring BSs is interrupted, reporting the interruption.

12. The method of claim 9, wherein the receiving of the at least one CBP packet comprises receiving a plurality of CBP packets, the transmitting of the received at least one CBP packet comprises transmitting the plurality of received CBP packets through the plurality of directional antennas, and further wherein the transmitting of the plurality of received CBP packets comprises synchronizing the transmission of the plurality of received CBP packets using a common system clock.

13. The method of claim 9, further comprising transmitting a message to the plurality of neighboring BSs during at least one of initialization and after initialization.

14. An operation method of a Base Station (BS) in a wireless communication system, the method comprising:
  permitting access of a Mobile Station (MS) according to a preset process;
  identifying if the MS includes a dedicated equipment transmitting a Coexistence Beacon Protocol (CBP) packet;
  if the MS is identified as the dedicated equipment, gathering corresponding information from the dedicated equipment transmitting the CBP packet;
  scheduling CBP packet transmission according to the corresponding information;
  when there is a notification of a link with a neighboring BS and the dedicated equipment transmitting the CBP packet, updating the link information; and
  transmitting a CBP packet to a non-linked BS according to a preset process.

15. The method of claim 14, wherein the corresponding information comprises information on a link between the dedicated equipment, equipped with a plurality of directional antennas, and a neighboring BS.

16. The method of claim 14, wherein the identifying of the MS as the dedicated equipment transmitting the CBP packet comprises using one of a Media Access Control (MAC) address, and a registration request/ranging request message and a dedicated ranging code.

* * * * *